May 31, 1966     K. A. ALBERS     3,253,410

FLUID PRESSURE POWER TRANSMISSION SYSTEM

Filed July 9, 1965     3 Sheets-Sheet 1

INVENTOR.
KENNETH A. ALBERS
BY
Wayne B. Easton
ATTORNEY

May 31, 1966        K. A. ALBERS        3,253,410

FLUID PRESSURE POWER TRANSMISSION SYSTEM

Filed July 9, 1965        3 Sheets-Sheet 2

INVENTOR.
KENNETH A. ALBERS

BY Wayne B. Easton

ATTORNEY

May 31, 1966  K. A. ALBERS  3,253,410

FLUID PRESSURE POWER TRANSMISSION SYSTEM

Filed July 9, 1965  3 Sheets-Sheet 3

INVENTOR.
KENNETH A. ALBERS

BY Wayne B. Easton
ATTORNEY

United States Patent Office 3,253,410
Patented May 31, 1966

3,253,410
FLUID PRESSURE POWER TRANSMISSION SYSTEM
Kenneth A. Albers, Minneapolis, Minn., assignor to Char-Lynn Company, Minneapolis, Minn., a corporation of Minnesota
Filed July 9, 1965, Ser. No. 470,684
1 Claim. (Cl. 60—52)

This invention relates to a fluid pressure power transmission system which functions automatically to provide pressurized fluid at a relatively high pressure and low volume to a fluid pressure operated motor when a high torque output for the motor is required and pressurized fluid at a relatively low pressure and high volume when a lower torque and a higher speed for the motor is desired.

A main object of the invention is to provide a new and improved fluid pressure power transmission system of the type referred to above.

Other objects and advantages will become apparent from the following specification, appended claims and attached drawings.

Figure 1:
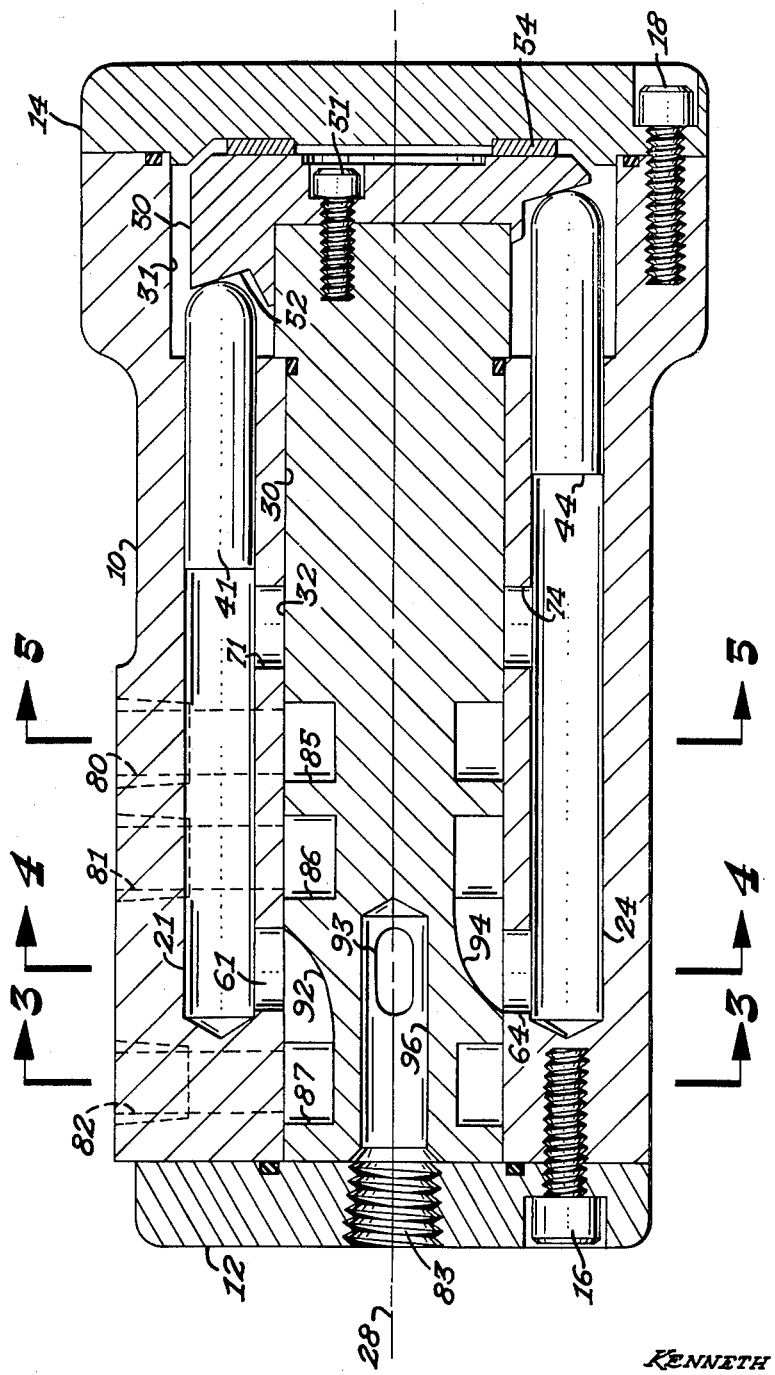
FIG. 1 is a longitudinal sectional view of a fluid pressure intensifier of a type which may be utilized in the power transmission system of the present invention and which is taken on line 1—1 of FIG. 4.
Figure 2:
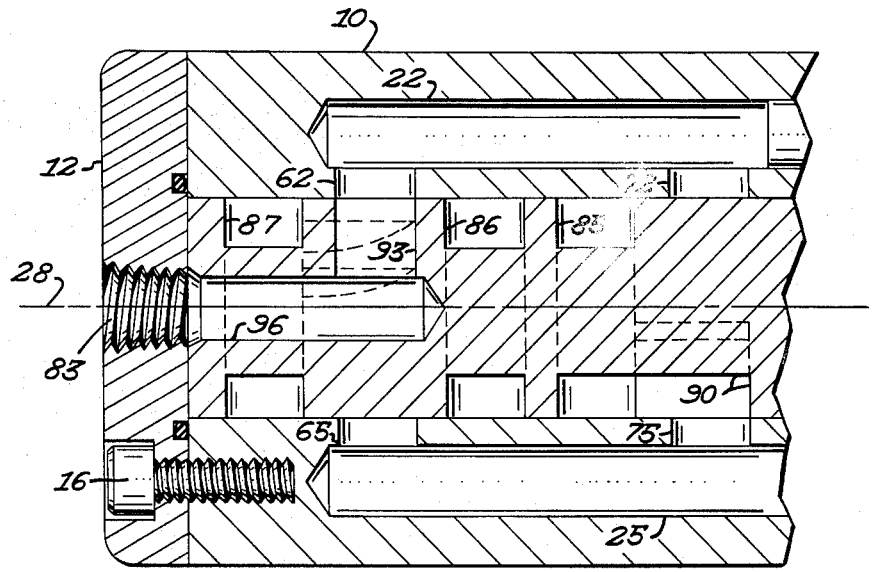
FIG. 2 is a fragmentary longitudinal sectional view of the fluid pressure intensifier shown in FIG. 1 which is taken on line 2—2 of FIG. 5.

In order to explain the fluid pressure power transmission system of the present invention it is first necessary to explain in detail one element of the system which is referred to herein as pressure intensifier or a divider-intensifier.

The pressure intensifier is illustrated as being embodied in a barrel type fluid pressure device but it could be embodied in a variety of different types of fluid pressure devices such as sliding vane, radial piston and gerotor types of devices.

The fluid pressure device or pressure intensifier illustrated has a generally cylindrical and annularly shaped casing or housing 10 with circular or disc shaped end covers 12 and 14. End covers 12 and 14 are attached respectively to the casing 10 with sets of circumferentially spaced bolts 16 and 18.

Casing 10 is provided with a plurality of circumferentially spaced and arranged cylindrical bores 21 to 26 which extend longitudinally in parallel relation to the axis 28 of the device. Casing 10 has a central bore 30 and a counterbore 31, both being coaxial relative to axis 28. Rotatably disposed in bore 30 is a cylindrically shaped valve 32 having an end portion with a slightly larger diameter to form an annular shoulder to position valve 32 in casing 10.

A plurality of cylindrically shaped pistons 41 to 47 are slidably disposed in the bores 21 to 26 in fluid sealing engagement with the cylindrical walls of the bores. Means for reciprocating the pistons is provided in the form of a swash plate 50 which is attached to valve 32 with bolts 51. Swash plate 50 has a flat surface 52 which is inclined relative to the device axis 28 and the degree of inclination and the radial distances of bores 21 to 26 from the device axis 28 determine the strokes for the pistons 41 to 47. Valve 32 and swash plate 50 rotate together and an annularly shaped thrust bearing 54 is disposed between the swash plate and end cover 14 to provide rotatable support against the axial thrust transmitted to the swash plate through the pistons 41 to 47.

Casing bores or cylinders 21 to 26 are provided with radially extending, circumferentially arranged exhaust ports 61 to 66 which have respective fluid communication with casing bores 21 to 26 and open into the surface of casing bore 10 in the form of circumferentially arranged and spaced openings in the plane of line 4—4 of FIG. 1. Casing bores or cylinders 21 to 26 are also provided with radially extending, circumferentially arranged feed ports 71 to 76 which have respective fluid communication with casing bores 21 to 26 and open into the surface of casing bore 10 in the form of circumferentially arranged and spaced openings in a plane somewhat to the right of the plane of line 5—5 of FIG. 1. Pistons 41 to 46 could be attached to swash plate 50 in a known manner so that the rotation of the swash plate would cause the pistons to reciprocate in the bores 21 to 26. As pistons 41 to 46 are optionally illustrated as only being in abutting engagement with the swash plate, however, the swash plate will function to move the pistons to the left and the pressurized fluid admitted through ports 61 to 66 causes the pistons to move to the right into abutting engagement with the swash plate.

Figure 3:
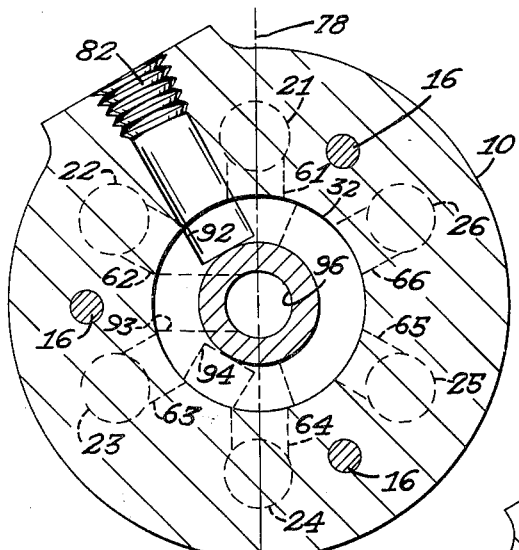
FIG. 3 is a transverse sectional view taken on line 3—3 of FIG. 1.
Figure 4:
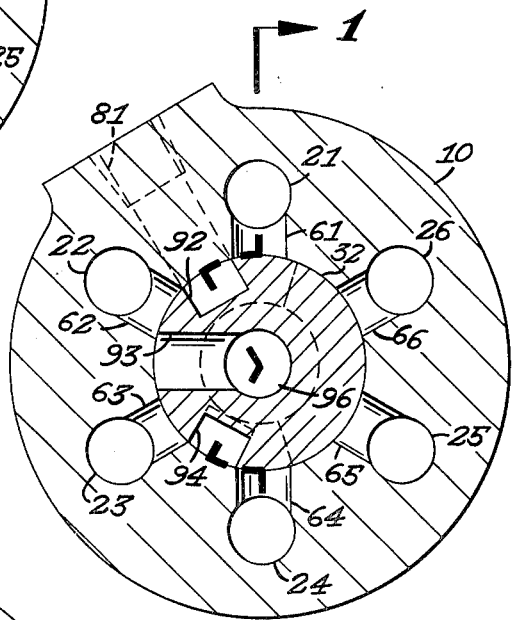
FIG. 4 is a transverse sectional view taken on line 4—4 of FIG. 1.
Figure 5:
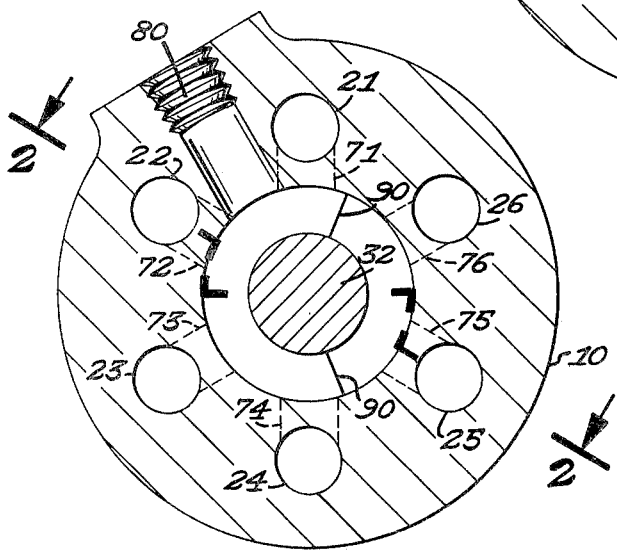
FIG. 5 is a transverse sectional view taken on line 5—5 of FIG. 1.

As will appear more fully further on, valve 32 has diametrically separated feed and exhaust sides. In the position valve 32 is shown in FIGS. 3, 4 and 5, the vertical centerline 78 shown in FIG. 3 represents the line or diameter which separates the feed and exhaust sides of the pump. As valve 32 and swash plate 50 rotate together, the chambers or bores 21 to 26 on the feed side of valve 32 are caused to expand by reason of the pressurized fluid forcing pistons on the feed side to the right against the retreating portion of the swash plate surface 52. Similarly, the chambers or bores 21 to 26 on the exhaust side of the valve 32 are caused to contract by reason of the advancing portion of swash plate surface 52 pushing the pistons on the exhaust side of the valve to the left.

Casing 10 is provided with an inlet port 80 and exhaust ports 81 and 82. End cover plate 12 is provided with a third exhaust port 83. Valve 32 has three axially spaced annular channels 85, 86 and 87 which have respective fluid communication with fluid inlet port 80 and exhaust ports 81 and 82.

Valve 32 has on the feed side thereof a feed passage 90 which extends generally from the plane of line 5—5 of FIG. 1 to the plane of feed ports 71 to 76 to facilitate the feed of fluid from the inlet port 80 to the feed ports 71 to 76. With reference to FIG. 5, the circumferential length of feed passage 90 is such that it extends between but does not overlap the feed ports 71 and 74 when the valve 32 is in the position shown in FIG. 5. Assuming that the direction of rotation of valve 32 is counterclockwise, fluid under pressure from inlet port 80 flows into annular channel 85, into valve feed passage 90, into casing ports 75 and 76 to bores or chambers 25 and 26 which are expanding. The feed to port 74 and chamber 24 has just been cut off because the piston 44 in bore 24 has just reached the top of its stroke and is about to be forced in the other direction by swash plate 50. The feed to port 71 and chamber 21 will begin after a small amount of further rotation by valve 32 to supply fluid for forcing piston 41, which has just reached the bottom of its stroke, to the right against the receding surface 52 of swash plate 50.

Valve 32 has on the exhaust side thereof three exhaust passages 92, 93 and 94 in the plane of line 4—4 of FIG. 1.

Valve 32 has a central bore 96 in axial alignment with fluid outlet port 83 and valve passage 93 has the form of a slot which extends from the outer cylindrical surface of valve 32 into the bore 96. Valve passage 92 is slot shaped and has constant fluid communication with annular channel 87 and fluid outlet port 82. Valve passage 94 is slot shaped and has constant fluid communication with annular channel 86 and fluid outlet port 81. Exhaust passages 92, 93 and 94 are of such a size and so arranged on the exhaust side of the valve 32 so that each of the contracting ones of the chambers 21 to 26 is at all times feeding into one of the exhaust passages. With reference to FIG. 4, the conditions prevailing when the valve is in the position shown in FIG. 4 are that valve passage 92 is in slightly overlapping relation to ports 61 and 62, valve passage 93 is in slightly overlapping relation to ports 62 and 63 and valve passage 94 is in slightly overlapping relation to ports 63 and 64.

Assuming that valve 32 moves in a counterclockwise direction valve passage 92 is moving into register with port 62 such that the fluid from the contracting chamber 22 will be exhausted through outlet port 82, valve passage 93 is moving into register with port 63 such that the fluid from contracting chamber 23 will be exhausted through outlet port 83, and valve passage 94 is moving into register with valve port 64 such that the fluid from contracting chamber 24 will exhaust through fluid outlet 81. Thus with the fluid pressure device shown fluid is admitted through one inlet port 80 but is divided and exhausted through three fluid outlets 81, 82 and 83.

It is realized that with the valving arrangement illustrated the physical dimensions thereof may not be sufficient in some cases to permit the contracting chambers to freely and completely exhaust into passages 92, 93 and 94 such that a binding action or cavitation might occur. Known means to avoid undesirable operation of that kind may be employed such as appropriately placed by-passes, notches or relief valving. Such means are not shown, however, because they are well known per se and would have no bearing on the basic principles of the invention.

Referring further to the operation of the device, each time one of the chambers 21 to 26 contracts, the exhaust therefrom flows sequentially into the exhaust valve passages 92, 93 and 94 so that approximately, if not exactly, one-third of the exhaust from each contracting chamber flows through each of the exhaust passages 92, 93 and 94 to the respective fluid outlets 82, 83 and 81. The device thus functions as a flow divider with the fluid admitted through inlet port 80 being discharged through the three fluid outlet ports 81, 82 and 83.

It will also be seen how the device functions as a pressure intensifier or pressure multiplier. To permit an understanding of this function it should first be observed that pressurized fluid fed to the chambers 21 to 26 which are expanding is effective over an area which corresponds to the combined cross-sectional areas of the pistons in the expanding chambers and the resultant force is effective to rotate valve 32 against the resistance of the fluid being pumped out of the chambers 21 to 26 which are contracting. If all of the three outlets 81, 82 and 83 were open to the atmosphere, the resultant force referred to would simply have the effect of rotating valve 32 at a relatively high speed. If only one of the outlets, such as outlet 81, were open to atmosphere by directing the flow therefrom to a drain reservoir there would at all times be one contracting chamber being drained to atmosphere. The total resultant force of the pressurized fluid in the three expanding chambers would then be concentrated on forcing the fluid out of the other two contracting chambers. Fluid outlets 82 and 83 would of course have to be connected to some type of energy absorbing device such as a hydraulic motor which would offer resistance to the flow of fluid from outlets 82 and 83 so that pressure can be developed in the two contracting chambers which are connected to the outlets 82 and 83. The pressure developed in the two contracting chambers connected to outlets 82 and 83 will be higher than the pressure of the fluid admitted to the fluid inlet 80.

A still higher pressure can be developed if two of the fluid outlets are vented to atmosphere and only one of the fluid outlets is connected to an energy absorbing device such as a hydraulic motor. In the latter case, however, the volume of fluid delivered to the energy absorbing device will be proportionately smaller because a proportionately larger amount of fluid will be directed to the reservoir.

The device may also be used as a fluid flow integrator whereby fluid admitted through fluid outlet ports 81, 82 and 83 will be integrated and flow out of inlet port 80. The device may also be used as a pump or motor if a power shaft is provided in driving relation relative to the valve 32.

Figure 6:
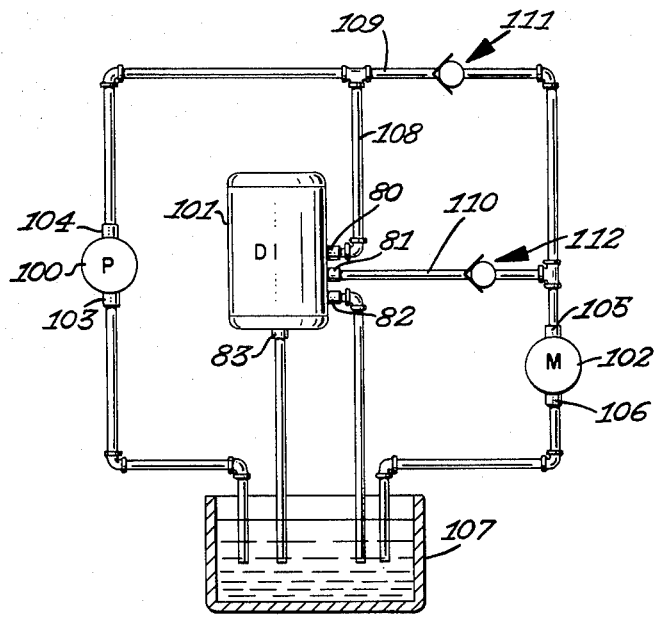
FIG. 6 is a schematic diagram of a fluid pressure power transmission system which embodies the invention.

Referring now to the fluid pressure power transmission system which is the subject of the present invention, an illustration of such a system is shown in FIG. 6. In FIG. 6 there is shown a pump 100, a divider-intensifier 101 of the type illustrated in FIGS. 1 to 5, and a fluid pressure motor 102 which may be of any type such as a sliding vane or gear type motor. The motor 102 may be a hydraulically operated motor which is utilized to drive the wheel of a vehicle such as a tractor or a grader or a passenger type vehicle. A hydraulic motor used for this purpose must have a source of relatively high pressure fluid available for starting purposes in order for the motor to develop sufficient torque to overcome the inertia of a vehicle to remain at rest. After the vehicle is in motion the pressure requirements for the motor 102 will be considerably smaller.

The divider-intensifier 101 has one inlet port 80 and three outlet ports 81, 82 and 83. Pump 100 has a fluid inlet port 103 and a fluid outlet port 104. Motor 102 has a fluid inlet port 105 and a fluid outlet port 106. A sump or reservoir 107 is provided from which pump 100 draws fluid and to which fluid is drained from the fluid outlet ports 82 and 83 of the divider-intensifier 101 and the fluid outlet port 106 of the motor 102. Branch conduits 108 and 109 are provided through which the pump 100 can deliver fluid to the divider-intensifier 101 and the motor 102. Fluid outlet port 81 of the divider-intensifier 101 is connected to the inlet port 105 of motor 102 through a conduit 110. Check valves 111 and 112 are provided respectively in conduits 109 and 110.

It will be assumed for purpose of illustration that the pump 100 delivers fluid having a pressure of 100 p.s.i. and that fluid at a pressure of 100 p.s.i. is not high enough to develop a torque in motor 102 which is sufficient to overcome the resting inertia of the vehicle. Fluid at 100 p.s.i. delivered directly from pump 100 to motor 102 through conduit 109 would thus develop too low a starting torque in motor 102 to be adequate. The starting resistance of motor 102 would create a back pressure which would cause the fluid from pump 100 to flow to the divider-intensifier 101 through conduit 108.

Divider-intensifier 101 increases the pressure of fluid delivered to it in the manner explained in describing the device shown in FIGS. 1 to 5 and thus fluid delivered from divider-intensifier 101 to motor 102 through conduit 110 will have an increased pressure of say 200 p.s.i., for example, depending on the design of unit 101. Assuming the 200 p.s.i. pressure would be sufficient to cause the vehicle to accelerate, the back pressure of motor 102 would diminish as the acceleration increases and become steady at say 80 p.s.i. when the vehicle reaches its cruising speed.

When the back pressure of motor 102 is reduced to a pressure which is less than the pressure developed by the pump 100, the line of least resistance for the flow of fluid will be through conduit 109 directly to the motor 102 and only a small portion of fluid if any would then be directed to the motor 102 and via divider-intensifier 101. Whenever the motor 102 is required to develop more torque by reason of the vehicle encountering a hill, for example, fluid in varying portions will automatically be diverted through divider-intensifier 101 and fluid at an increased pressure will be supplied to the motor 102 to sufficiently increase the torque output of motor 102 to meet the requirement for more torque.

While one embodiment of the invention is described here, it will be understood that it is capable of modification, and that such modification, including a reversal of parts, may be made without departure from the spirit and scope of the invention as defined in the claim.

What I claim is:

A fluid pressure system comprising a pressure intensifier unit which divides pressurized fluid flowing thereto into at least two streams of fluid with one stream developing a higher pressure than said pressurized fluid when directed against a sufficiently large hydraulic load and a second stream having a lower pressure than said pressurized fluid when directed to a region having a lower pressure than said pressurized fluid, said pressure intensifier unit having an inlet port and at least two fluid outlet ports, a fluid pressure source, a fluid pressure operated motor having an inlet port and an outlet port, conduit means from said fluid pressure source having a first branch leading to said inlet port of said pressure intensifier unit and a second branch leading to said inlet port of said motor, exhaust conduit means extending from a first one of said fluid outlet ports of said pressure intensifier unit to said second branch conduit, first check valve means in said exhaust conduit means for allowing fluid flow only in the direction of said motor, second check valve means in said second branch in parallel with said first check valve means for allowing fluid flow only in the direction of said motor, and means for connecting a second one of said fluid outlet ports of said pressure intensifier unit to a region of lower pressure than said pressure source.

References Cited by the Examiner

UNITED STATES PATENTS

| | | | |
|---|---|---|---|
| 2,169,456 | 8/1939 | Wahlmark | 91—175 |
| 2,340,100 | 1/1944 | Arndt | 91—175 X |
| 3,188,963 | 6/1965 | Tyler | 103—49 X |

EDGAR W. GEOGHEGAN, *Primary Examiner.*